US012769280B2

(12) United States Patent
Schubert et al.

(10) Patent No.: US 12,769,280 B2
(45) Date of Patent: Oct. 20, 2026

(54) COMPUTER IMPLEMENTED METHOD FOR GENERATING THERMALLY IMPROVED MACHINE CONTROL DATA FOR ADDITIVE MANUFACTURING MACHINES

(71) Applicant: Airbus Operations GmbH, Hamburg (DE)

(72) Inventors: Konstantin Schubert, Hamburg (DE); Jorne Driezen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 786 days.

(21) Appl. No.: 18/191,204

(22) Filed: Mar. 28, 2023

(65) Prior Publication Data

US 2023/0315049 A1 Oct. 5, 2023

(30) Foreign Application Priority Data

Mar. 29, 2022 (EP) .................................... 22165280

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
CPC ...... G05B 19/4099; G05B 2219/49023; B29C 64/393; B29C 64/118; B33Y 50/02
USPC .......................................................... 700/119
See application file for complete search history.

(56) References Cited

U.S. PATENT DOCUMENTS

| | | | | |
|---|---|---|---|---|
| 2017/0239892 | A1* | 8/2017 | Buller | B28B 17/0081 |
| 2019/0217416 | A1* | 7/2019 | Brochu | G06F 30/23 |
| 2019/0240775 | A1* | 8/2019 | Graham | B22F 10/36 |
| 2020/0038983 | A1* | 2/2020 | Sato | B33Y 10/00 |

(Continued)

FOREIGN PATENT DOCUMENTS

| | | | |
|---|---|---|---|
| EP | 3549746 | A1 | 10/2019 |
| WO | 2018217903 | A1 | 11/2018 |

(Continued)

OTHER PUBLICATIONS

European Search Report for European U.S. Appl. No. 22/165,280 dated Sep. 8, 2022; priority document.

(Continued)

*Primary Examiner* — Kamini S Shah
*Assistant Examiner* — Michael Tang
(74) *Attorney, Agent, or Firm* — Greer, Burns & Crain, Ltd.

(57) ABSTRACT

A method for generating improved machine control data. Event series is generated from input machine control data that is linked with a mesh data that is also generated from the input machine control data. Thus, an activation time (t_act) is determined which indicates the point in time at which the additive manufacturing machine prints a portion of the object that is represented by that mesh element. A full 3D-thermal simulation is run on the mesh elements. Each time the element temperature (T_el) exceeds a predetermined threshold, the activation time (t_act) is increased by a predetermined time increment and the event series is updated. Finally the event series is converted back to output machine control data.

14 Claims, 4 Drawing Sheets

(56) References Cited

U.S. PATENT DOCUMENTS

| | | | |
|---|---|---|---|
| 2021/0046710 | A1 | 2/2021 | Koopmans et al. |
| 2022/0088880 | A1 | 3/2022 | Sovani |

FOREIGN PATENT DOCUMENTS

| | | | |
|---|---|---|---|
| WO | 2019070644 | A1 | 4/2019 |
| WO | 2020247544 | A1 | 12/2020 |

OTHER PUBLICATIONS

A. Cattenone et al., "Finite Element Analysis of Additive Manufacturing Based on Fused Deposition Modeling: Distortions Prediction and Comparison with Experimental Data" Journal of Manufacturing Science and Engineering, vol. 141, No. 1, Nov. 8, 2018.

Bi Jing et al., "Finite Element Simulation of the Fused Deposition Modelling Process" https://www.researchgate.net/profile/Jing-Bi/publication/313819691_Finite_Element_Simulation_of_the_Fused_Deposition_Modelling_Process/links/59ea620f4585151983c7f042/Finite-Element_Simulation-of-the-Fused-Deposition-Modelling-Process.pdf; Sep. 6, 2022.

J. Driezen et al., "In-situ Adaptive Thermal Simulation Method for Predicting and Avoiding Hotspots in Material Extrusion Processes" Rapid Prototyping Journal, Aug. 2, 2022; pp. 1492-1508.

* cited by examiner

1: Step Time = 0.2000

3: Step Time = 0.6000

2B: Step Time = 5.600

4: Step Time = 9.400

COMPUTER IMPLEMENTED METHOD FOR GENERATING THERMALLY IMPROVED MACHINE CONTROL DATA FOR ADDITIVE MANUFACTURING MACHINES

CROSS-REFERENCES TO RELATED APPLICATIONS

This application claims the benefit of European Patent Application Number 22165280-3 filed on Mar. 29, 2022, the entire disclosure of which is incorporated herein by way of reference.

FIELD OF INVENTION

The invention relates to additive manufacturing. Specifically the invention relates to a computer-implemented method for generating output machine control data for additive manufacturing machines.

BACKGROUND OF THE INVENTION

WO 2018/217 903 A1 discloses a machine learning-based method for automated object defect classification and adaptive, real-time control of an additive manufacturing and/or welding processes.

WO 2019 070 644 A1 discloses a method for utilizing multicriteria optimization in simulating various parameters in additive manufacture to generate build instructions for an additive manufacture machine in view of conflicting objectives.

WO 2020/247 544 A1 discloses a method for selecting processing parameters for building an object by additive manufacturing. The processing parameters for the build are modified based on a 2D finite difference simulation for each layer.

SUMMARY OF THE INVENTION

It is an object of the invention to improve additive manufacturing. The object may be achieved by the one or more embodiments described herein.

The invention provides a computer-implemented method for generating output machine control data that are adapted for causing an additive manufacturing machine to print an object by layering extruded material, the method comprising:

a) generating event series data from input machine control data, wherein the input machine control data are adapted for causing an additive manufacturing machine to print an object by layering extruded material;

b) generating mesh data, that includes a plurality of mesh elements, and linking the mesh data with the event series data so as to determine an activation time for each mesh element, wherein the activation time is indicative of the point in time at which the additive manufacturing machine prints a portion of the object that is represented by that mesh element;

c) determining the mesh elements that are to be activated in a next time step interval as the to-be-activated mesh elements;

d) determining neighbor mesh elements of the to-be-activated mesh elements within a predetermined boundary;

e) determining an element temperature for the neighbor mesh elements;

f) if the element temperature exceeds or is below a predetermined temperature threshold, increasing or decreasing the activation time of each to-be-activated mesh element and updating the corresponding entries in the event series data, otherwise leave the activation time of each to-be-activated mesh element unchanged;

g) repeating steps c) to f) until step c) results in no more to-be-activated mesh elements to obtain updated event series data; and, h) converting the updated event series data into the output machine control data.

Preferably, in step a) the input machine control data includes an indication of a target location of movement, print speed, and/or an amount of material extruded, and the event series data is generated based on one, some, or all of these indications.

Preferably, in step a) the input machine control data comprises a sequence of machine commands that are indicative of a target location of movement, print speed, and/or an amount of material extruded, wherein the event series data is generated from pairs of subsequent machine commands.

Preferably, in step b) for each mesh element, orientation data is generated and associated with the mesh element, wherein the orientation data is indicative of the orientation of the mesh element along the three principal directions based on the printing direction.

Preferably, the total printing time is divided into a plurality of time step intervals, and preferably in step c) the time step interval ranges from a step time to the step time plus a predetermined time increment.

Preferably, in step d) the boundary is chosen such that at least one neighbor mesh element and at least one to-be-activated mesh element belong to a different printing layer.

Preferably, in step d) the boundary is chosen such that the neighbor mesh elements include at least one mesh element that is located below a to-be-activated mesh element.

Preferably, in step e) the element temperature is determined as an average temperature, a minimum temperature, a maximum temperature, a mean temperature, depending on a defect to be avoided.

Preferably, in step e) the element temperature is determined based on first conducted heat that gets transferred between adjacent neighbor mesh elements due to elapsed time.

Preferably, in step e) the element temperature is determined based on second conducted heat that gets introduced into the material represented by the neighbor mesh elements due to the activation of the to-be-activated mesh elements.

Preferably, in step e) the element temperature is determined based on convective heat that gets removed from the material represented by neighbor mesh elements due to convection.

Preferably, in step e) the element temperature is determined based on radiative heat that gets removed from the material represented by the neighbor mesh elements due to heat radiation.

Preferably, in step e) the element temperature is determined based on latent heat that is introduced to or removed from the material represented by the neighbor mesh elements due to a phase transition of that material.

Preferably, in step f), if the element temperature exceeds a predetermined temperature threshold, increasing the activation time of each to-be-activated mesh element and updating the corresponding entries in the event series data, otherwise leave the activation time of each to-be-activated mesh element unchanged.

Preferably, in step f), if the element temperature is below a predetermined temperature threshold, decreasing the activation time of each to-be-activated mesh element and updating the corresponding entries in the event series data, otherwise leave the activation time of each to-be-activated mesh element unchanged.

Preferably, in step h) the event series data is converted such that the activation time according to the event series data is achieved by adapting the printing speed.

Preferably, in step h) the printing speed is increased for a decreased activation time.

Preferably, in step h) the printing speed is decreased for an increased activation time.

Preferably, in step h) the event series data is converted such that the activation time according to the event series data is achieved by controlling a flow of pressurized air to impinge on the object.

Preferably, in step h) the event series data is converted such that the activation time according to the event series data is achieved by introducing machine commands into the output machine control data that cause the additive manufacturing machine to interrupt printing for a predetermined amount of time, while preferably moving a hot end out of contact with the object.

The invention relates to a computer program comprising instructions which, when the program is executed by a computer, cause the computer to carry out one, some, or all of the steps of a preferred method.

The invention relates to a data carrier or data carrier signal comprising the computer program.

The invention relates to a data processing apparatus comprising means for carrying out the preferred method.

The invention provides a method for additive manufacturing an object by layering extruded material, the method comprising:

a) performing a preferred method so as to obtain output machine control data;
b) printing the object by layering extruded material in a manner controlled by the output machine control data.

The invention provides an additive manufacturing apparatus comprising means for carrying out the preferred method.

The idea presented herein relates to the field of 3D printing. It is especially relevant for technologies working with high performance thermoplastics such as the material extrusion techniques; Fused Deposition Modelling (FDM), Fused Layer Modelling (FLM), Fused Filament Fabrication (FFF), Fused Composite Manufacturing (FCM) and Powder Bed Fusion techniques.

As shown in the prior art, thermal considerations are also relevant with regards to other 3D printing processes, such as Selective Laser Sintering (SLS), Direct Energy Deposition (DED) and Selective Laser Melting (SLM).

The relevant technologies have in common that heat is used to build a part layer-by-layer. The thermal history field usually determines the mechanical properties of the part and its performance as well as robustness and quality of the printed results. Some typical defects of prints with inappropriate settings include: hotspots, curling corners, delamination, blobs, degradation of the printing material, burnt surfaces and microscale defects.

The known solutions include generating a thermal simulation, analyzing the thermal behavior and adapting the geometry, key process parameters or orientations using multiple iterative experiments and simulations trials.

Current solutions are, however, limited to the use of 2D stacked layers, limiting the full potential of real three-dimensional printing. In other words, current approaches do not consider situations in which the print orientation is out of plane.

In contrast to the prior art, the ideas presented herein are able to be applied to full 3D capabilities, as exemplified by the curved layers in FIG. 1. It is also possible to determine the key process parameters in-situ needed for the printing process during a single simulation iteration.

With the measure disclosed herein trial an error experimentation for defining key process parameters of the 3D printing process can be avoided. The enabling of in-situ variation of the key process parameters during the process simulation and adapting the original machine code basically in real time, allows for a decreased design and sizing time. Furthermore, it is possible to ensure that the resulting machine code avoids thermal defects. Also the inter-layer adhesion between subsequent printed materials can be improved. Overall the invention allows to reduce effort needed for quality control of the parts without compromising reliability. In addition the amount of post-processing needed can be reduced.

The pre-processor reads the original machine code line-by-line and extracts the key data from the print job. Based on the location of movement, the print speed and the amount of material extruded, each pair of data lines is being converted into event series. Using the outer dimensional boundaries of the event series, layer height and line width of the printing process, a voxel mesh is being generated and built around the event series. Then, by aligning the event series with the mesh, the activation time and orientation for each of the elements is being calculated and saved into a data file.

In the thermal simulation, the data file is being read and elements are activated if the time step in the simulation corresponds to the element activation time (t_act). For each time step the following steps are performed:

The coordinates of the 'to be' activated elements are identified. Based on these coordinates, a search location is defined within a boundary box. The size, location and geometry of the boundary box can be adapted to the purpose of the experimentation. The time steps can also be adapted to the experimentation.

In this example, the boundary box is defined as the elements directly below each of the activated elements. Depending on the amount of identified elements in the boundary box, the element temperature (or other conditions) are calculated and stored. The entries in the event series are adapted based on a specified condition, which in this example is to increase the activation time of the elements (t_act) with the step time (dtime).

Each time the condition is true, the respective layer, time and time increment are written to an external data file. The output from the simulation is then run into a post-processor, which adapts the original machine code accordingly and thereby generates a new machine code, which can be used to print the part without violating a THRESHOLD temperature during printing.

The method will be described as an example focused on the detection and avoidance of hotspots in the 3D printing process. However, it should be noted that the method is also applicable to other criteria, such as adapting the process parameters for improved inter-laminar properties, enhanced (and controlled) material crystallinity, decreased thermal deformations and other performance related results. In general, the idea may be seen as a method, which his implemented into a thermal process simulation tool, to vary the key process parameters of the printing process, in order to tweak the resulting thermal behavior of the part and therefore to allow control of its quality, mechanical properties, dimensional stability and/or process robustness.

BRIEF DESCRIPTION OF THE DRAWINGS

Embodiments of the invention are described in more detail with reference to the accompanying schematic drawings that are listed below.

DETAILED DESCRIPTION OF THE PREFERRED EMBODIMENTS

Figure 1:
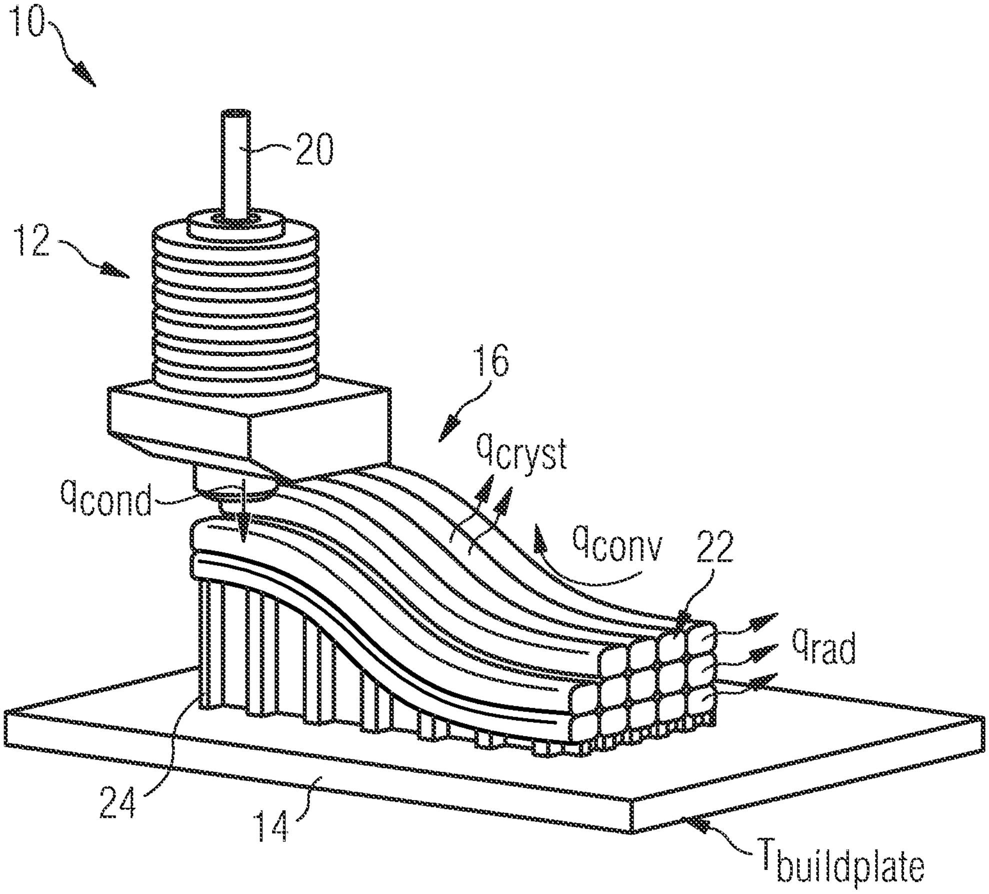
FIG. 1 partially depicts an additive manufacturing machine.

Referring to FIG. 1 an embodiment of an additive manufacturing machine 10 is partially depicted. In a known manner, the additive manufacturing machine 10 comprises a hot end 12 that is movable relative to a build plate 14 to print an object 16. Feedstock 20, e.g. filament, is fed into the hot end 12 and subsequently extruded to form layered lines 22 that are fused together. In addition, a support structure 24 can be printed to support portions of the object 16 that could not be printed otherwise.

The additive manufacturing machine 10 is controlled by machine control data that are usually obtained by slicing a CAD model of the object. The slicing determines among others the locations, speeds, amount of extruded material with which the additive manufacturing machine 10 deposits extruded feedstock 20, as well as temperatures of the hot end 12 and the build plate 14.

However, so far the slicing does not take into account thermal considerations. In other words, it is possible that certain defects, e.g. hot spots, can be generated, if the object 16 has tapered portions, for example. In this case the heat introduced during printing the tapered portion can prevent the extruded feedstock material from cooling enough so that the next layer deposited causes a deformation. Other consequences may be curling corners, delamination, blobs, degradation of the printing material, burnt surfaces and microscale defects, which can be caused also due to too large amounts of heat entering the object 16.

Figure 2A:
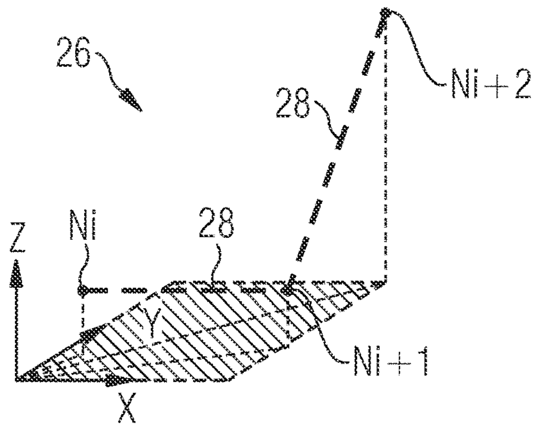
FIG. 2A depicts a first step for generating activation time.

Referring to FIG. 2A, input machine control data are fed into a pre-processor that extracts event series data 26. The input machine control data are organized in data lines represented as Ni, Ni+1, Ni+2. The data lines include machine commands that control the location of the hot end 12 and/or build plate 14, the printing speed, and/or the amount of extruded material.

The event series data 26 include a plurality of events 28 that are defined as a transition between two subsequent data lines.

Figure 2B:
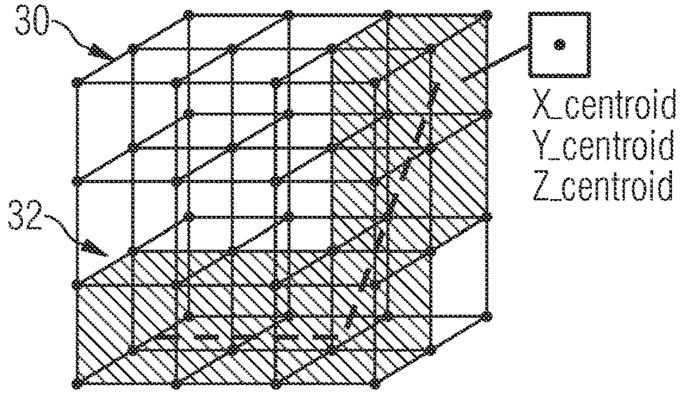
FIG. 2B depicts a second step for generating activation time.

As shown in FIG. 2B, mesh data 30 that includes a plurality of mesh elements 32 are generated based on the outer dimensional boundaries of the event series data 26. In an example, the mesh data 30 can be mesh mesh data and the mesh elements 32 can be mesh elements. Other parameters of the event series data 26 such as layer height and/or line width of the printing process may also be used in generating the mesh data 30.

An activation time t_act for each mesh element 32 is determined by aligning the event series data 26 with the mesh data 30. The activation time t_act is indicative of the point in time at which the additive manufacturing machine 10 prints a portion of the object 16 that is represented by that mesh element 32.

Figure 2C:
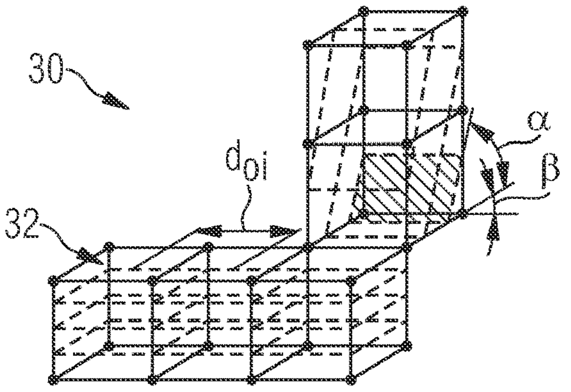
FIG. 2C depicts a third step for generating activation time.

As shown in FIG. 2C, the orientation, e.g. directional cosines of $\alpha$, $\beta$, of mesh elements 32 along the components of the three principal directions x, y, z based on the print direction can also be determined. With this the orthotropy of the printing process can be taken into account and anisotropic material properties can be assigned to each mesh element 32.

After the above-described pre-processing step, the preprocessed output data, i.e. the preprocessed event series data 26, preferably includes an index value or count value, a mesh element number, orientation angles $\alpha$, $\beta$, $\gamma$, the activation time t_act, xyz coordinates of the mesh element 32 and/or a new layer flag. The new layer flag indicates that a new printing layer starts with this mesh element 32 and all subsequent entries of mesh elements 32 are considered part of the same layer, until another new layer flag is set.

Figure 3:
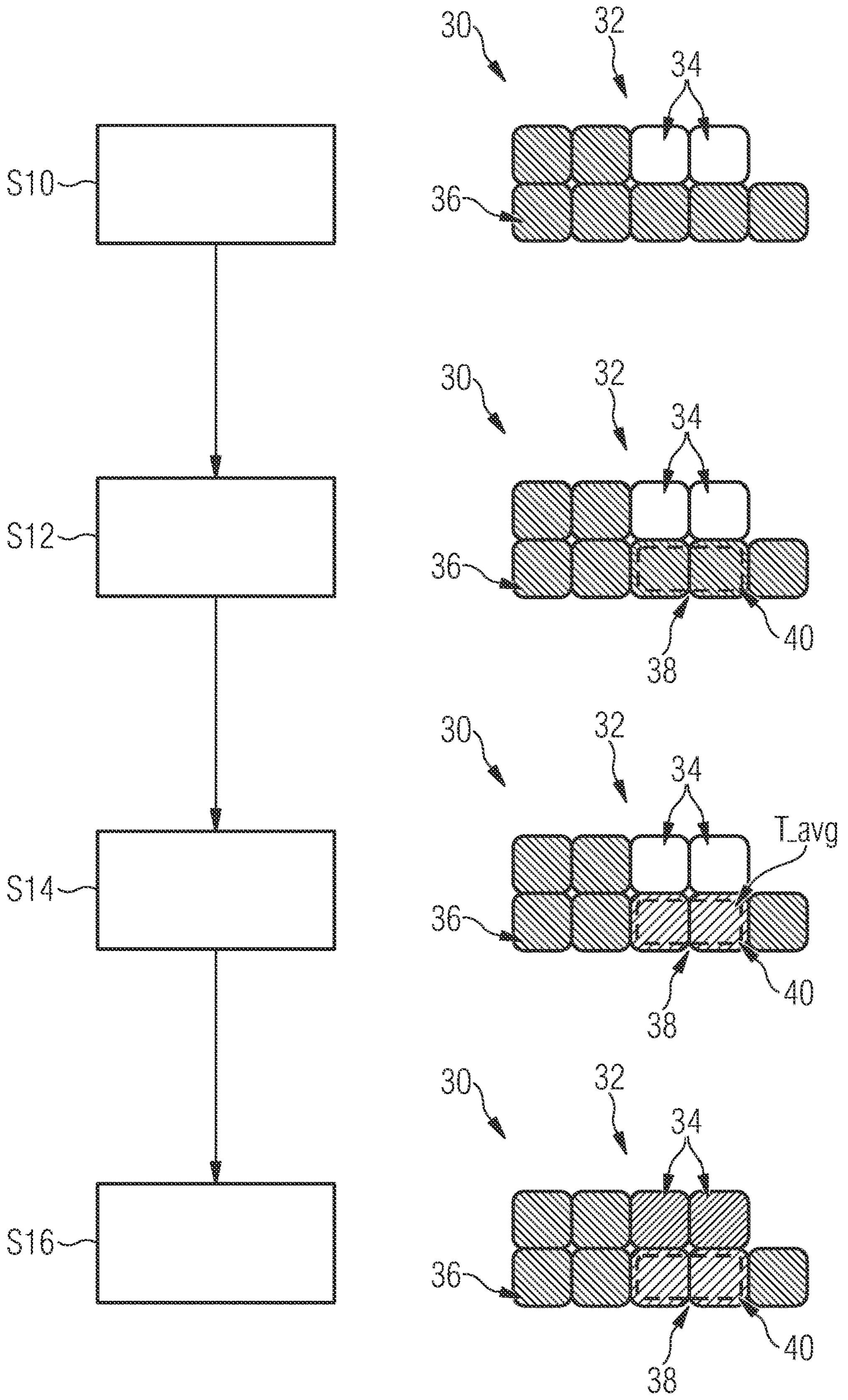
FIG. 3 depicts steps for determining the thermal properties of the mesh elements.

FIG. 3 exemplifies further processing of the preprocessed event series data 26 in a thermal simulation.

In an initial step S10, those mesh elements 32 that are to be activated next, i.e. the to-be-activated mesh elements 34 are determined based on the previously determined activation time t_act. The already activated mesh elements 36 are also shown.

In other words, in this step it is determined which portion of the object 16 that is represented by the to-be-activated mesh elements 34 is printed next within a predetermined time interval. The time interval ranges from a current step time to the current step time plus a predetermined time increment. These values are chosen such that they are suitable for the used additive manufacturing machine 10.

In a search step S12, at least one neighbor mesh element 38 is determined. The neighbor mesh element 38 is chosen within a predetermined boundary 40. Here, as an example, the boundary is given by the activated mesh elements 36 that are adjacent below the to-be-activated mesh elements 34. It should be noted that other boundary shapes may be chosen, e.g. all adjacent mesh elements.

In a thermal simulation step S14, the element temperature T_el, of the neighbor mesh elements 38 is determined. In determining the element temperature T_el, different heat contributions that influence the element temperature T_el are taken into account.

A first conducted heat that gets transferred between adjacent neighbor mesh elements due to elapsed time is taken into account. This would be the usual averaging.

Furthermore, a second conducted heat q_cond (FIG. 1) can be taken into account. The second conducted heat q_cond is introduced into the material represented by the neighbor mesh elements 38 due to the activation of the to-be-activated mesh elements 34. In other words, the second conducted heat q_cond takes into account the increase in temperature due to the new extruded material deposited onto the existing layers.

Also, a convective heat q_conv (FIG. 1) can be used. The convective heat q_conv gets removed from the material represented by neighbor mesh elements 38 due to convection. In general the convective heat q_conv represents the printing environment and heat flow into the environment. The convective heat q_conv may in particular be based on active cooling or a temperature controlled build space for example.

Furthermore, radiative heat q_rad (FIG. 1) can be used in determining the element temperature T_el. The radiative heat q_rad is removed from the material represented by the neighbor mesh elements due to heat radiation. The radiative heat q_rad can also be determined based on the orientation of the neighbor mesh elements thereby giving a better estimate of the area radiating.

Finally, latent heat q_cryst (FIG. 1) can be used in determining the element temperature T_el. Latent heat q_cryst is introduced to or removed from the material represented by the neighbor mesh elements 38 due to a (first order) phase transition of that material. For example, if the print material is at least partially crystalline, the latent heat released from formation or absorbed for dissolution of the crystallites can be taken into account.

In a modification step S16, the element temperature T_el previously determined is compared with a predetermined temperature threshold. The temperature threshold is chosen based on the defects that are to be avoided. Here, as an example, the temperature threshold is chosen so as to avoid overheating and thereby allowing preservation of the geometric dimensions of the object 16 under print.

If the element temperature T_el is determined to exceed the temperature threshold, then the activation time t_act of the to-be-activated mesh elements 34 is increased, preferably by a predetermined time increment.

This process is repeated until there are no more to-be-activated mesh elements 34. In other words the process is repeated until the whole object 16 was thermally simulated once and only once.

The event series data 26 are constantly updated during this process, in particular with modified activation times t_act, wherever the temperature threshold is exceeded.

In a last step, the updated event series data 26 are converted to output machine control data that include machine commands.

One option to achieve an increased activation time t_act is implementation of a wait signal in which the hot end 12 moves away from the object 16 and waits for a certain amount of time determined by the activation times t_act.

Another option is to decrease the print speed to ensure that the hot end 12 will reach the target location at the original time (i.e. the one that would cause overheating) plus the wait time (i.e. the time added to avoid said overheating).

FIGS. 4A to 4D shows how the results of the thermal simulation translate into the output machine control data.

Figure 4A:
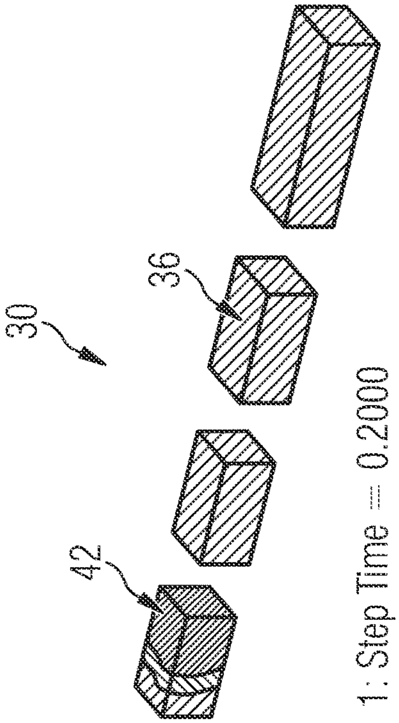
FIG. 4A depicts an example of printing with updated machine control data.

FIG. 4A shows a hot spot 42 in an otherwise regular layer.

Figure 4B:
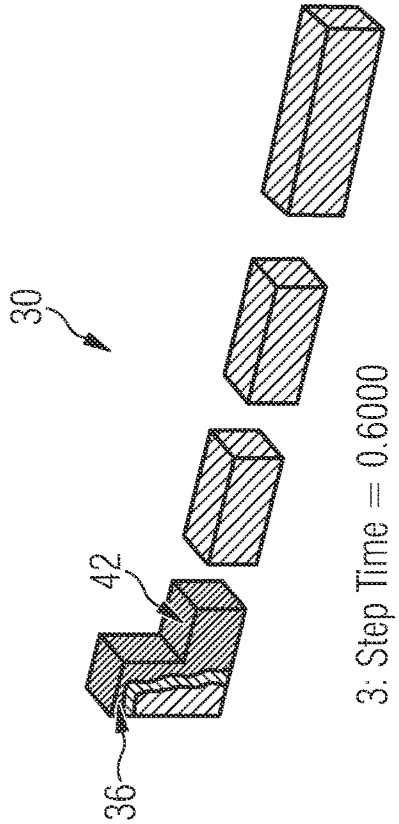
FIG. 4B depicts another example of printing with updated machine control data.

FIG. 4B shows a just printed portion of the object 16 comprising activated mesh elements 36 in the next layer.

Figure 4C:
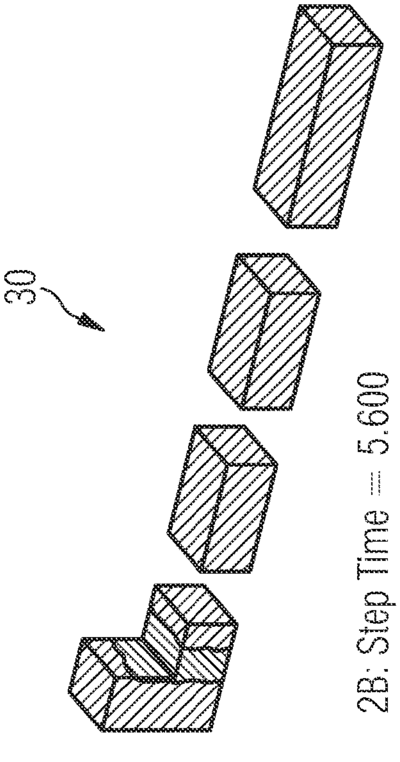
FIG. 4C depicts a further example of printing with updated machine control data; and, FIG. 4D depicts yet another example of printing with updated machine control data.

FIG. 4C shows the situation after a wait time of five seconds. The hot spot 42 has dissipated.

Figure 4D:
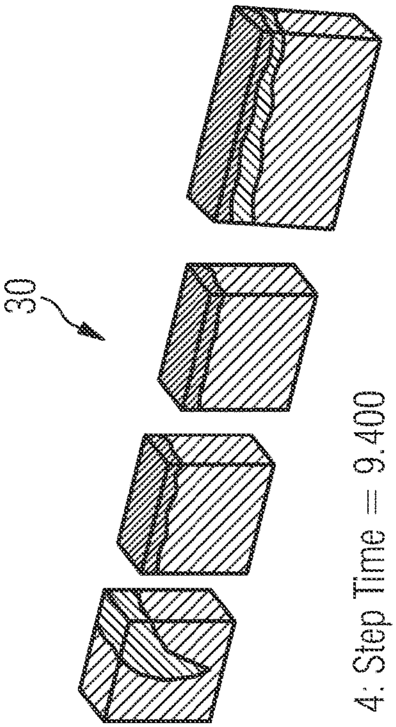

FIG. 4D shows the situation after finishing the next layer. The mesh elements 32 of this layer are now all activated mesh elements 36.

The respective layer, time, and time increment are written to an external data file each time the utility routine is called and the condition is true.

The implemented waiting signals in the simulation allow the material to cool.

Applicant conducted experiments with an off-the-shelf Ultimaker S5 as a validation platform in which the boundary conditions were calibrated, neglecting unknown parameters in the process. The validation was conducted by printing a wall and recording the temperature history using an IR camera to determine the most efficient option (i.e. the highest cooling rate). For this, two walls were printed in series with the same total print time as a single wall to mimic a waiting signal.

The results show that decreasing the print speed is more efficient and can likely be explained by the constant cooling of the fan directly on the part. Considering that a printing process without travel movements and stops results in a more aesthetic and accurate result, reduction of print speed is the more advantageous option.

In order to improve additive manufacturing, in particular with respect to thermal considerations, a method for generating improved machine control data is proposed. Initially and event series (26) is generated from input machine control data that is linked with a mesh mesh (30) that is also generated from the input machine control data. Thus, an activation time (t_act) is determined which indicates the point in time at which the additive manufacturing machine (10) prints a portion of the object (16) that is represented by that mesh element (32). A full 3D-thermal simulation is run on the mesh elements (32). Each time the element temperature (T_el) exceeds a predetermined threshold, the activation time (t_act) is increased by a predetermined time increment and the event series (26) is updated. Finally the event series (26) is converted back to output machine control data.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 additive manufacturing machine
12 hot end
14 build plate
16 object
20 feedstock
22 layered line
24 support structure
26 event series data
28 event
30 mesh data
32 mesh element
34 to-be-activated mesh element
36 activated mesh element
38 neighbor mesh element
40 boundary
42 hot spot

The invention claimed is:

1. A method for generating output machine control data that are adapted in real-time and configured to cause an additive manufacturing machine to print an object by layering extruded material, the method comprising:

a) generating event series data from input machine control data, wherein the event series data include a plurality of events that are defined as a transition between two subsequent data lines of the input machine control data, wherein the input machine control data comprise a sequence of machine commands that are indicative of a target location of movement, print speed, an amount of material extruded or a combination thereof, wherein the event series data are generated from pairs of subsequent machine commands, wherein the input machine control data are configured to cause an additive manufacturing machine to print an object by layering extruded material;

b) generating mesh data based on outer dimensional boundaries of the event series data, wherein the mesh data includes a plurality of mesh elements, and linking the mesh data with the event series data so as to determine an activation time (t_act) for each mesh element, wherein the activation time (t_act) is indicative of a point in time at which the additive manufacturing machine prints a portion of the object that is represented by said plurality of mesh elements;

c) determining mesh elements of the plurality of mesh elements that are to be activated in a next time step interval as to-be-activated mesh elements;

d) determining, from of the plurality of mesh elements, neighbor mesh elements of the to-be-activated mesh elements within a predetermined boundary, wherein the boundary is chosen such that at least one neighbor mesh element and at least one to-be-activated mesh element belong to a different printing layer;

e) determining an element temperature (T_el) for the neighbor mesh elements;

f) when the element temperature exceeds or is below a predetermined temperature threshold, increasing or decreasing the activation time (t act) of each to-be-activated mesh element and updating the corresponding entries in the event series data, otherwise leaving the activation time (t_act) of each to-be-activated mesh element unchanged;

g) repeating steps c) to f) until step c) results in no more to-be-activated mesh elements to obtain updated event series data; and, h) converting the updated event series data into the output machine control data such that: the activation time according to the event series data is achieved by adjusting a printing speed, or by controlling a flow of pressurized air to impinge on the object, or both;

or the activation time according to the event series data is achieved by introducing machine commands into the output machine control data that cause the additive manufacturing machine to interrupt printing for a predetermined amount of time, while moving a hot end out of contact with the object; or both; and, i) printing the object by layering extruded material based on the output machine control data.

2. The method according to claim 1, wherein in step a) the input machine control data includes an indication of a target location of movement, print speed, an amount of the material extruded, or a combination thereof, and wherein the event series data is generated based on one, some, or all of these indications.

3. The method according to claim 1, wherein in step a) the input machine control data comprises a sequence of commands that are indicative of a target location of movement, print speed, an amount of the material extruded, or a combination thereof, and wherein the event series data is generated from pairs of subsequent commands.

4. The method according to claim 1, wherein in step b) for each mesh element, an orientation data is generated and associated with the mesh element, wherein the orientation data is indicative of an orientation of the mesh element along the three principal directions based on the printing direction.

5. The method according to claim 1, wherein in step d) the boundary is chosen such that the at least one neighbor mesh element includes at least one mesh element that is located below a to-be-activated mesh element.

6. The method according to claim 1, wherein in step e) the element temperature is determined based on a) first conducted heat that gets transferred between adjacent neighbor mesh elements due to elapsed time;

b) second conducted heat (q_cond) that gets introduced into the material represented by the neighbor mesh elements due to an activation of the to-be-activated mesh elements;

c) convective heat (q_conv) that gets introduced to or removed from the material represented by neighbor mesh elements due to convection;

d) radiative heat (q_rad) that gets removed from the material represented by the neighbor mesh elements due to heat radiation;

e) latent heat (q cryst) that is introduced to or removed from the material represented by the neighbor mesh elements due to a phase transition of that material; or f) any combination of the foregoing.

7. A non-transitory computer readable medium storing a computer program comprising instructions which, when the program is executed by a computer, cause the computer to carry out the method according to claim 1.

8. A data processing apparatus comprising the non-transitory computer readable medium according to claim 7.

9. The method according to claim 1, wherein in step e) the element temperature (T_el) is determined as an average temperature, a minimum temperature, a maximum temperature, or a mean temperature, depending on a defect to be avoided.

10. The method according to claim 1, wherein in step f), when the element temperature (T_el) exceeds a predetermined temperature threshold, the activation time (t_act) of each to-be-activated mesh element is increased and the corresponding entries in the updated event series data are further updated, otherwise the activation time (t_act) of each to-be-activated mesh element remains unchanged.

11. The method according to claim 1, wherein in step f), when the element temperature (T_el) is below a predetermined temperature threshold, the activation time (t_act) of each to-be-activated mesh element is decreased and the corresponding entries in the updated event series data are further updated, otherwise the activation time (t_act) of each to-be-activated mesh element remains unchanged.

12. The method according to claim 1, wherein in step h) the printing speed is increased for a decreased activation time (t_act); or wherein in step h) the printing speed is decreased for an increased activation time (t_act); or both.

13. A method for generating output machine control data that are configured to cause an additive manufacturing machine to print an object by layering extruded material, the method comprising:

a) generating event series data from input machine control data, wherein the input machine control data are configured to cause an additive manufacturing machine to print an object by layering extruded material;

b) generating mesh data, that includes a plurality of mesh elements, and linking the mesh data with the event series data so as to determine an activation time (t_act) for each mesh element, wherein the activation time (t_act) is indicative of a point in time at which the additive manufacturing machine prints a portion of the object that is represented by said plurality of mesh elements;

c) determining mesh elements of the plurality of mesh elements that are to be activated in a next time step interval as to-be-activated mesh elements;

d) determining, from of the plurality of mesh elements, neighbor mesh elements of the to-be-activated mesh elements within a predetermined boundary;

e) determining an element temperature (T_el) for the neighbor mesh elements;

f) when the element temperature exceeds or is below a predetermined temperature threshold, increasing or decreasing the activation time (t_act) of each to-be-activated mesh element and updating the corresponding entries in the event series data, otherwise leaving the activation time (t_act) of each to-be-activated mesh element unchanged;

g) repeating steps c) to f) until step c) results in no more to-be-activated mesh elements to obtain updated event series data; and, h) converting the updated event series data into the output machine control data; and, i) printing the object by layering extruded material based on the output machine control data, wherein in step b) for each mesh element, an orientation data is generated and associated with the mesh element, wherein the orientation data is indicative of an orientation of the mesh element along the three principal directions based on the printing direction.

14. A method for generating output machine control data that are configured to cause an additive manufacturing machine to print an object by layering extruded material, the method comprising:

a) generating event series data from input machine control data, wherein the input machine control data are configured to cause an additive manufacturing machine to print an object by layering extruded material;

b) generating mesh data, that includes a plurality of mesh elements, and linking the mesh data with the event series data so as to determine an activation time (t_act) for each mesh element, wherein the activation time (t_act) is indicative of a point in time at which the additive manufacturing machine prints a portion of the object that is represented by said plurality of mesh elements;

c) determining mesh elements of the plurality of mesh elements that are to be activated in a next time step interval as to-be-activated mesh elements;

d) determining, from of the plurality of mesh elements, neighbor mesh elements of the to-be-activated mesh elements within a predetermined boundary;

e) determining an element temperature (T_el) for the neighbor mesh elements;

f) when the element temperature exceeds or is below a predetermined temperature threshold, increasing or decreasing the activation time (t_act) of each to-be-activated mesh element and updating the corresponding entries in the event series data, otherwise leaving the activation time (t act) of each to-be-activated mesh element unchanged;

g) repeating steps c) to f) until step c) results in no more to-be-activated mesh elements to obtain updated event series data; and, h) converting the updated event series data into the output machine control data; and, i) printing the object by layering extruded material based on the output machine control data, wherein in step h) the updated event series data is converted such that the activation time (t_act) according to the event series data is achieved by introducing machine commands into the output machine control data that cause the additive manufacturing machine to interrupt printing for a predetermined amount of time, and wherein the printing is interrupted for a predetermined amount of time while moving a hot end out of contact with the object.

* * * * *